(No Model.)

C. F. WINKLER.
SECONDARY BATTERY.

No. 471,592.  Patented Mar. 29, 1892.

WITNESSES:
Frank S. Ober
W. A. Rosenbaum

INVENTOR
Charles F. Winkler
BY
W. J. Johnston
ATTORNEY.

UNITED STATES PATENT OFFICE.

CHARLES F. WINKLER, OF TROY, NEW YORK.

SECONDARY BATTERY.

SPECIFICATION forming part of Letters Patent No. 471,592, dated March 29, 1892.

Application filed September 29, 1891. Serial No. 407,167. (No model.)

*To all whom it may concern:*

Be it known that I, CHARLES F. WINKLER, a citizen of the United States, residing in Troy, county of Rensselaer, and State of New York, have invented certain new and useful Improvements in Secondary Batteries, of which the following is a specification.

My invention has reference to secondary electeric batteries, the object being to provide a battery in which the supporting element for the active material is constructed of insulating material, and therefore capable of being made very light in weight.

Another object of the invention is to provide a simple form of conductor for the plate, which may be applied thereto in the simplest manner.

Another object of the invention is the production of a method whereby comminuted lead may be deposited upon or in the support of insulating material.

The invention will now be described in detail, with reference to the accompanying drawings, in which—

Figure 1:
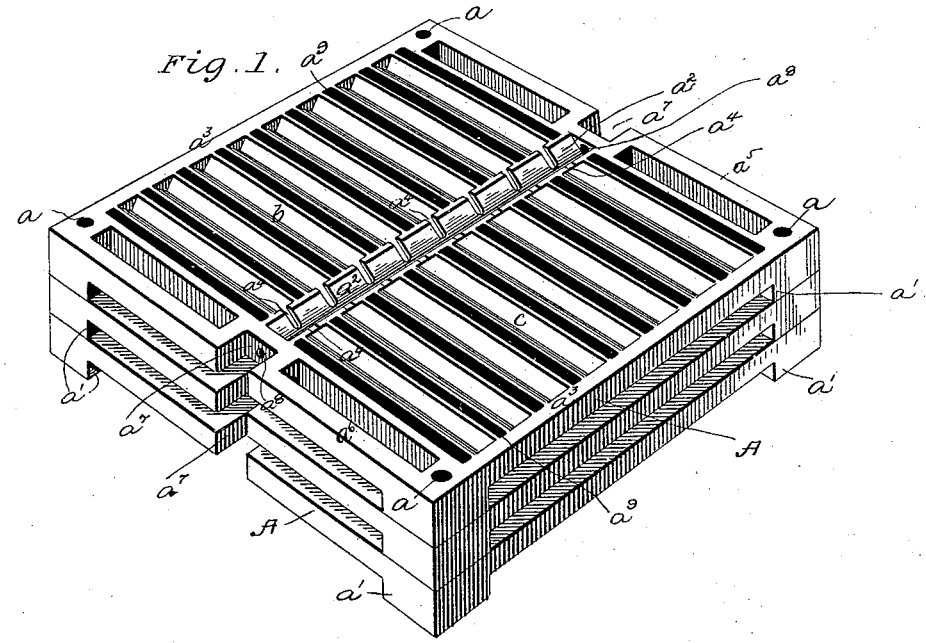
Figure 2:
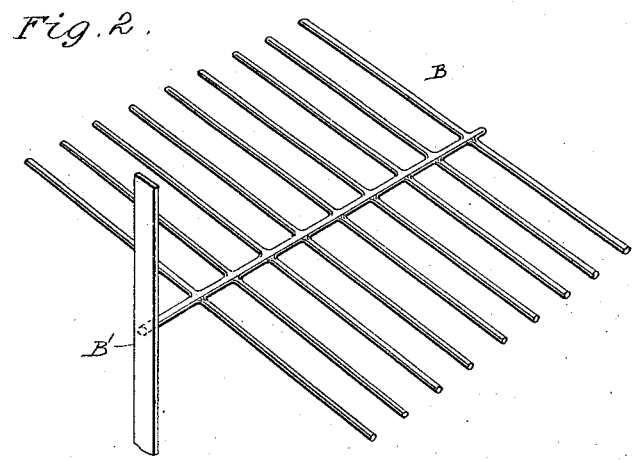
Figure 3:
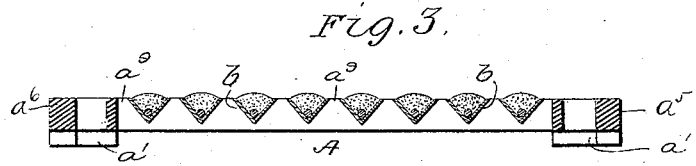

Figure 1 is a perspective view of a number of the supporting-plates placed in the cell in their proper relative position, but without the active material and conducting element. Fig. 2 is a perspective view of the conductor forming a portion of the plate, and Fig. 3 is a vertical section of the plate.

Referring to the drawings by letter, A represents a supporting plate or frame constructed, preferably, of celluloid or some other suitable insulating material. Celluloid is preferred because it is light in weight and is slow to disintegrate when in the presence of acid. This plate is rectangular in form and occupies a horizontal position when in the cell. At its four corners it may be enlarged, as shown, to accommodate bolts $a$, either insulated or not, for the purpose of binding them all together. Each plate may also have formed upon it feet $a'$, which rest upon the plate next below and serve as spacing devices to hold the plates apart. Through the middle of the plate, along one of its diameters, is arranged a central or trunk trough $a^2$, which is substantially V-shaped in cross-section. Communicating with this trough on either side are two series of troughs $b$ and $c$. These are located at right angles to the trough $a^2$, and extend from the latter to the side pieces $a^3 a^3$, respectively, of the plate. Notches $a^4$ are cut in the side of the trough $a^2$ directly opposite the ends of the troughs $b$ and $c$, which form passages from said troughs to the trough $a^2$. The side pieces $a^5 a^6$ of the plate, which connect with the ends of the trough $a^2$, are set in at their point of connection with said trough, so as to form notches $a^7$ in the sides of the plate, and a circular hole $a^8$ is formed in each of these set-in portions of the frame, forming outlets from the trough $a^2$. Between the adjacent troughs of the series $b$ and $c$ a space $a^9$ is left for the circulation of the electrolyte.

B represents the electric conductor, which forms a part of each electrode or plate. It consists of a central wire or backbone and a series of wires branching therefrom at right angles and arranged on each side thereof, all of the wires being in a single plane. The branch wires are separated by a space equal to the distance between the centers of the troughs $b$ and $c$. They are also of about the same length as said troughs. These wires are made, preferably, of lead and are of sufficient diameter to carry the current passing through the battery without heating. They are ordinarily of about the size of a No. 12 or 14 Brown & Sharp gage. This conductor is deposited in the plate by simply dropping the main wire or backbone into the trough $a^2$ and allowing the branch wires respectively to fall into the troughs $b$ and $c$. The notches $a^4$ permit the wires to lie on the bottom of the trough. The main wire or backbone is slightly extended, so as to pass through the holes $a^8$ at each end of the trough $a^2$ and on the outside thereof to be connected at one end with a larger upright metallic strip B', which extends upward and forms the connecting-lug for all the plates of one polarity. The positive and negative plates are alternately arranged above each other and the connecting-lug for all of the positive plates occupies the notches $a^7$ on one side of the series, while the connecting-lug for the negative plates occupies the notches on the other side of the series. The connection between the main wire of each conductor and the upright strip is made, preferably, by solder. The active material may be applied to the supporting-plates A either mechanically or by electrolysis. If mechanically applied, I prefer to use the process described in my application for patent, Serial No. 370,780, filed November 8, 1890, which consists in mixing the oxide of lead with acidulated water until the mass is in a semi-liquid condition, and then dipping the plates into it to fill all the troughs. The plate is then allowed to stand until the mass settles to the bottom of the troughs and the free water is poured off. This operation is repeated until the troughs are full of the oxide. One dipping, however, may suffice. It is observed that the conductor B is in position when the dipping is done, so that it will be buried in the active material when the troughs are full.

If the active material is to be applied by the process of electrolysis, I proceed as follows: The inner surface of the troughs is first washed with collodion or ether until the celluloid begins to dissolve and form a sticky mass. Then black lead is applied to form a thin layer of conducting material on the inside of the troughs. The dissolved celluloid acts as an adherent to hold the black lead. I then place the plate in the bath and electro-deposit lead in the troughs. The lead is thus deposited in a finely-divided state, very loose and porous. The plate is then ready for forming by the well-known Planté process.

It will be observed that with a plate constructed as herein described the solution in the cell will have free circulation throughout the cell both in a lateral and vertical direction. Owing to the V-shaped form of the troughs, rising bubbles of gas will be allowed to come to the surface of the solution and not be held against the sides of the troughs.

It is obvious that many of the advantages of the construction of the plate herein described could be had by placing the middle trough $a^2$ along one side of the plate and having one set of branch troughs $b$ or $c$. In that case the conductor would also have but one set of branch wires.

Having thus described my invention, I claim—

1. In a secondary battery, a horizontal supporting-plate made of insulating material and provided with a main trough, and a series of branch troughs therefrom with free spaces between the troughs of the series for the circulation of the electrolyte, in combination with an electric conductor having a main strip, wire, or backbone and branches extending therefrom, the backbone being located in the said main trough and the branches located, respectively, in the branch troughs, and active material deposited in the troughs and surrounding and embedding the conductor, substantially as described.

2. In the manufacture of storage-batteries, the process herein described of making the electrodes, which consists in first forming a support of insulating material, then electro-depositing upon the same a quantity of lead, and finally "forming" in the usual manner.

3. In a secondary battery, a horizontal supporting-plate made of insulating material and provided with a main trough through the center and two series of branch troughs therefrom, one located on each side, in combination with an electric conductor having a main strip and branches extending therefrom, the main strip being located in the said main trough and the branches located, respectively, in the branch troughs, and active material located in the troughs and surrounding the conductors.

In witness whereof I have hereunto affixed my seal and signed my name in the presence of two subscribing witnesses.

CHARLES F. WINKLER. [L. S.]

Witnesses:
FREDERICK S. COTÉ,
EUGENE L. MERCHANT.